United States Patent [19]

Yale

[11] 4,291,777
[45] Sep. 29, 1981

[54] SHUTTLE CAR

[75] Inventor: Boyd R. Yale, Keen Mountain, Va.

[73] Assignee: Island Creek Coal Co., Lexington, Ky.

[21] Appl. No.: 68,976

[22] Filed: Aug. 23, 1979

[51] Int. Cl.³ .................... B60P 1/38; B62D 53/00; B62D 61/10
[52] U.S. Cl. ...................... 180/24.06; 180/24.12; 414/528
[58] Field of Search .............. 180/22, 24.01, 24.02, 180/24.06, 24.08, 24.12, 24.11, 14 R; 280/403; 414/528

[56] References Cited

U.S. PATENT DOCUMENTS

| | | | |
|---|---|---|---|
| 2,251,584 | 8/1941 | Fageol et al. | 280/403 |
| 3,154,163 | 5/1961 | Hagenbook | 180/22 |
| 3,185,324 | 5/1965 | Breithaupt et al. | 414/528 |

FOREIGN PATENT DOCUMENTS

| | | | |
|---|---|---|---|
| 666032 | 7/1963 | Canada | 180/24.01 |
| 355363 | 8/1961 | Switzerland | 180/24.08 |

Primary Examiner—John A. Pekar
Attorney, Agent, or Firm—Christie, Parker & Hale

[57] ABSTRACT

A mine-haulage vehicle is provided which consists of a first elongated body section providing a pair of steering wheels and coupled in articulating relation to an intermediate body section which is coupled in articulating relation to a third elongated body section providing a second pair of steering wheels. A first pair of driven wheels is provided by the intermediate body section with a common axis of rotation at or proximate to the first point of articulation. A second pair of driven wheels is provided by the third elongated body section with a common axis of rotation at or proximate to the second point of articulation.

9 Claims, 3 Drawing Figures

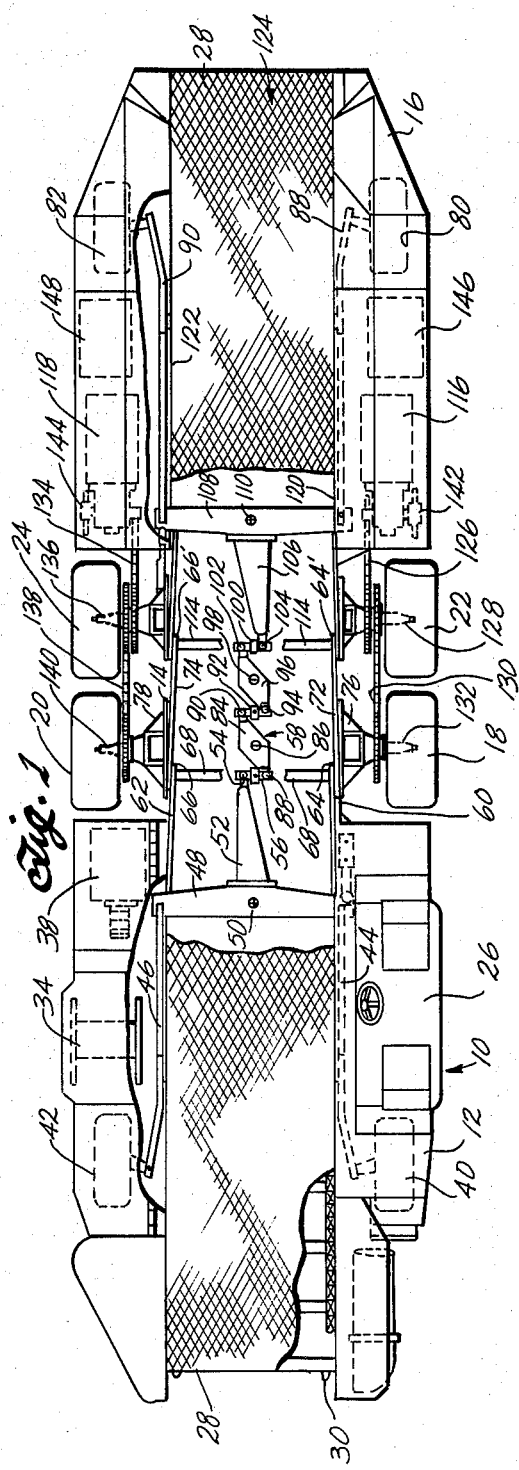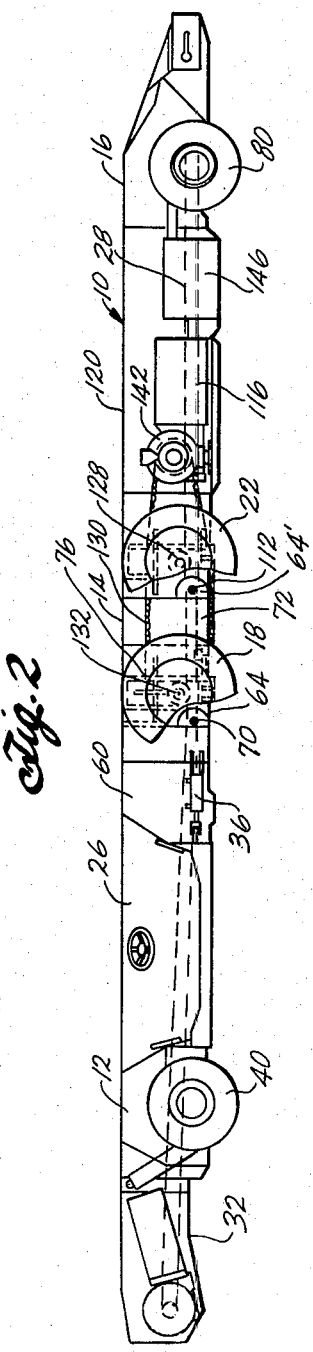

0## SHUTTLE CAR

BACKGROUND OF THE INVENTION

This invention relates to improved material haulage vehicles and, more particularly, to low-height mine-haulage vehicles of the type commonly known as "shuttle cars" used for hauling loose materials in underground trackless mines.

Shuttle cars have to carry heavy loads through low height, closely confined mine passageways with rough, uneven floors. Cars commonly used have a loading end with a pair of undriven steering wheels and a pair of driven wheels coupled in articulating relation to a discharge end also providing a pair of undriven steering wheels. The undriven steering wheels of the discharge end are coupled by a steering mechanism to the steering wheels of the loading end such that turning the steering wheels of the discharge end will result in an equal and opposite rotation of the steering wheels of the loading end.

Specific cars in common use are known as 18-SC shuttle cars manufactured and sold by Joy Manufacturing Company of Pittsburgh, Pennsylvania.

The structure of such cars is identified with U.S. Pat. Nos. 2,426,960; 2,590,300; 2,654,547; 2,777,526; 2,962,176; 2,472,048; 2,593,643; 2,654,548; 2,777,530; 2,970,664; 2,543,519; 2,654,382; 2,598,104, 2,913,964; 3,008,592; 2,589,235; 2,654,383; and 2,858,897 and U.S. Pat. No. Re. 24,178, each incorporated herein by reference.

While adaptive to many mining situations, where the mine surface is wet and uneven, the cars have experienced serious haulage problems. At times, the problem has become so acute that the cars could not be used, and the only coal produced was by using a scoop.

A need, therefore, exists for a car providing better traction on wet, uneven surfaces to alleviate the problems presently encountered with six wheel cars, providing a pair of driven wheels and two pair of undriven steering wheels.

SUMMARY OF THE INVENTION

According to the present invention, there is provided a shuttle car with two points of articulation and having driven wheel pairs coincident with or otherwise selectively located relative to such points of articulation.

In particular, the mine-haulage vehicle of this invention provides a body member comprising a first elongated body section providing at the first end thereof, a first pair of steering wheels and connected at an end opposite the first end thereof in articulating relation to a second intermediate body section to form a first point of articulation. The second intermediate body section is connected at a second end opposed to the first end thereof in articulating relation to the first end of a third elongated body section to form a second point of articulation. The second point of articulation is spaced from the first point of articulation, and the third elongated body section provides a second end opposed to the first end thereof a second pair of steering wheels. The body member includes compartments and conveying means for loading, carrying, and discharging mined materials. A first pair of driven wheels providing a common axis of rotation is coupled to the second intermediate body section at or proximate to the first point of articulation, and a second pair of driven wheels providing a common axis of rotation is coupled to the third elongated body section at or proximate to the second point of articulation. Preferably, the first pair of driven wheels having a common axis of rotation, is coupled to the second intermediate body section at or between the first and second points of articulation. A second pair of driven wheels is coupled to the third elongated body section at or between the second point of articulation and the second pair of steering wheels. There is provided means to drive the first and second pair of driven wheels.

It is presently preferred that the points of articulation be transverse and the axis of rotation of the driven wheels be at or adjacent and upwards from the respective first and second points of articulation.

BRIEF DESCRIPTION OF THE DRAWINGS

FIG. 1 illustrates a top view of an improved shuttle car of this invention.

FIG. 2 illustrates the side view of an improved shuttle car of this invention.

DETAILED DESCRIPTION

Figure 3:
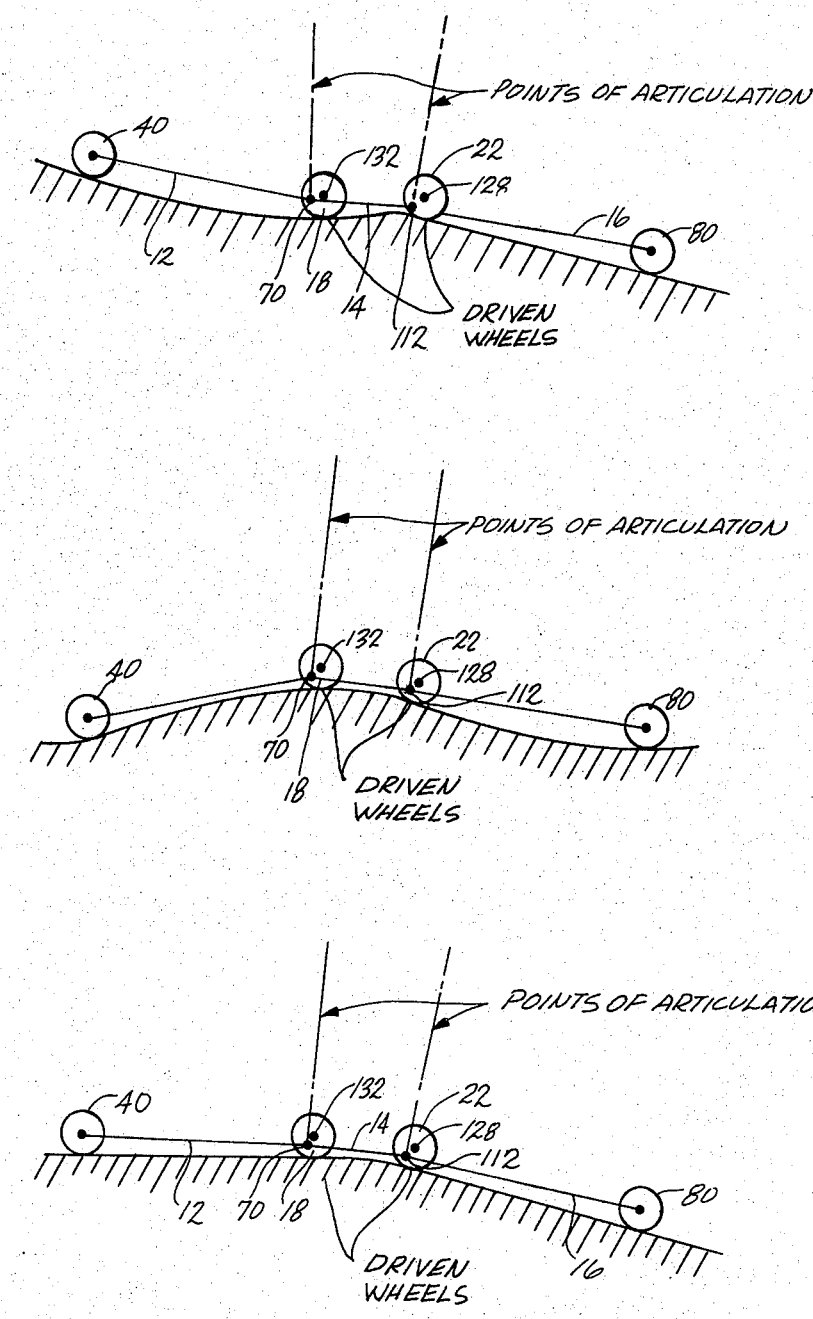
FIG. 3 graphically illustrates the great flexibility of the shuttle cars of this invention with respect to providing continuous traction over uneven surfaces.

FIGS. 1 and 2 illustrate an 18-SC shuttle car modified in accordance with the invention. With reference thereto, the body member 10 consists of a first elongated body section 12, commonly known as the discharge end of the shuttle car, an intermediate body section 14 coupled to the first body section in articulating relation and providing a pair of driven wheels 18 and 20, and the third elongated body section 16, commonly known in the art as the loading end of a shuttle car, coupled to the intermediate body section 14 in articulating relation and providing a second pair of driven wheels 22 and 24. The first elongated body section 12 may be of conventional manufacture consisting of an operator's cabin 26, a portion of roller supported endless conveyor belt 28, conveyor drive shaft 30, conveyor drive motor 32, cable reel 34, hydraulic steering jack 36, hydraulic pump motor 38, a pair of steering wheels 40 and 42, which may be driven or undriven, coupled by arms 44 and 46 to steering yoke 48 operating about pivot point 50. Arm 52 extends from yoke 48 and is connected by a ball and socket joint 54 to steering member 56, coupled to the steering linkage 58 added to the 18-SC shuttle car by means of the intermediate body section 14, as detailed below. Extending from the side walls 60 and 62 are semicircular members 64 and 66 which fit inside intermediate body section 14 and mate with apertures in intermediate body section 14 which are connected to hinge tube 68 to provide a first point of transverse articulation 70 ahead and downward of adjacent driven wheels 18 and 20, which are rigidly mounted to the side walls 72 and 74 of the intermediate body section 14 through axle mounts 76 and 78. A suitable hinge tube which incorporates part of the total steering linkage is described in U.S. Pat. No. 2,962,176, identified above and incorporated herein by reference.

Added intermediate body member 14 includes surfaces for travel of an endless conveyor belt 28, the driven wheels 18 and 20, and a steering linkage 58 to cause by rotation of steering wheels 40 and 42 in one direction, an equal and opposite rotation of steering wheels 80 and 82. Steering linkage 58 consists of a ball and socket joint 88 connected to bar 56, and is in turn connected by link means 84, providing pivot 86 and by ball and socket joint 90 to member 92, which is in turn connected by ball and socket joint 94 through linkage 96 having pivot point 98 to bar 100 by ball and socket joint 102. Bar 100 provides ball and socket joint 104 for coupling to arm 106 of yoke 108, having pivot point 110, which is in turn coupled by arms 88 and 90 to steering wheels 80 and 82. The intermediate section 14 is coupled to the third elongated body section 18 in the same manner as the first elongated section is coupled to the intermediate section, providing a second point of articulation 112, employing sections 64' and 66', extending from the intermediate body section 14 into third elongated body section 16 and hinge tube 114 extending transverse of body member 10.

While any means of driving driven wheels 18, 20, 22, and 24 may be employed, there is, as illustrated, presently employed two-speed drive motors 116 and 118 mounted outside of the side walls 120 and 122 of the cargo storage section 124. A chain and sprocket drive 126 extend from motor 116 to corresponding sprocket on axle 128 of driven wheel 22 and by chain and sprocket drive 130 to axle 132. Corresponding chain and sprocket drives 134 and 138 couple motor 118 to driven wheels 24 and 20. A more detailed illustration of useful drive systems is shown in U.S. Pat. No. 2,962,176, with a system for driving two wheel pairs being shown in U.S. Pat. No. 3,185,324, incorporated herein by reference, with particular reference being made to FIG. 16 and the related description. Braking is accomplished by friction brakes 142 and 144 on either side of the cars. Controllers 146 and 148 are coupled to the traction motors to provide energy thereto and control the speed of operation.

While the points of articulation, or hinge points, may vary in location for an 18-SC shuttle car, it is preferred that they be, as shown, adjacent to and below the line of the common axis of couplings 128 and 136, and 132 and 140 of the driven wheels 22, 24, 18 and 20 to the shuttle car.

Alternate systems of articulation are described in U.S. Pat. No. 3,827,720; 3,880,303 and 3,908,441, each incorporated herein by reference. Another preferred location for the points of articulation is coincident with the axis of rotation of the driven wheels. Although requiring to be attached to their respective intermediate and third elongated body sections, the driven wheels may also be ahead of the points of articulation.

The 18-SC shuttle car modified in accordance with this invention, provides two pairs of driven wheels with a point of articulation, or hinge point, between the two pairs of driven wheels and another point of articulation, or hinge point, between a pair of driven wheels and a pair of steering wheels. All wheels may, as described by U.S. Pat. No. 3,302,739, incorporated herein by reference, be driven. The axle assemblies may, as shown, be secured to the sidewalls of the body sections or extend transverse of the body sections, as described in U.S. Pat. No. 3,403,797, incorporated herein by reference.

With respect to the Joy 18-SC cars, cars with existing unaltered discharge ends and unaltered loading ends may be adapted for use in accordance with the invention by the addition of a 36-inch intermediate body section with steering linkage 58, driven wheels 18 and 20, chain and sprocket drives 130 and 138, and hinge tube 114.

FIG. 3 illustrates schematically the increased flexibility of the 18-SC shuttle car, modified in accordance with this invention, over a variety of terrains. The axis of steering wheels 40 and 80 of body sections 12 and 16 are illustrated as coupled to the points of articulation 70 of body section 14 and point of articulation 112 of body section 16. The axis of driven wheels 18 and 22 are respectively 132 and 128. The broken lines are taken normal to the points of articulation 70 and 112 relative to the intermediate and rear sections 14 and 16 to illustrate how they shift with changes in terrain.

As compared to the unmodified cars, the shuttle cars of the invention retrofitted with a 36-inch intermediate section providing an extra pair of driven wheels and an extra point of articulation conform more readily to undulations in the roadway and provide traction under wet conditions where the unadapted cars would be unable to operate.

Without changing the pair of 25 hp, two-speed, constant torque motors provided with the car as manufactured, the additional section provides a 24-cubic foot increase, enabling the coal carrying capacity to be increased by one ton and, because of more equal distribution of weight on all traction wheels, traction jacks and accumulators previously employed to shift weight when traction was lost have been eliminated from the hydraulic system.

The principles of the instant invention may be employed in the design of new shuttle cars as well as providing a retrofit intermediate section for modification of existing cars to enable the cars to travel where other six-wheel shuttle cars having a pair of traction wheels and a single point of articulation cannot, in practice, venture.

What is claimed is:

1. An articulated mine-haulage vehicle comprising:
 (a) a body member comprising a first elongated body section providing at a first end thereof, a first pair of steering wheels, said first elongated body section connected at an end opposed to the first end thereof in articulating relation to a first end of a second intermediate body section to form a first point of articulation, said second intermediate body section connected at a second end opposed to the first end thereof in articulating relation to a first end of a third elongated body section to form a second point of articulation spaced from the first point of articulation, the third elongated body section providing at a second end opposed to the first end thereof, a second pair of steering wheels, said body member including compartment and conveying means for loading, carrying and discharging mined materials;
 (b) a first pair of driven wheels having a common axis of rotation coupled to said second intermediate body section, the axis of rotation of said first pair of driven wheels being at or proximate to the first point of articulation;
 (c) a second pair of driven wheels having a common axis of rotation coupled to said third elongated body section, the axis of rotation of said second pair of driven wheels being at or proximate to the second point of articulation; and
 (d) means to drive said first and second pair of driven wheels.

2. An articulated mine-haulage vehicle comprising:
 (a) a body member comprising a first elongated body section providing at a first end thereof, a first pair of steering wheels, said first elongated body section connected at an end opposed to the first end thereof in articulating relation to a first end of a second intermediate body section to form a first point of transverse articulation, said intermediate body section connected at a second end opposed to the first end thereof in articulating relation to a first end of a third elongated body section to form a second point of transverse articulation spaced from the first point of transverse articulation, the third elongated body section providing at a second end opposed to the first end thereof a second pair of steering wheels, said body member including compartment and conveying means for loading, carrying, and discharging mined materials;

(b) a first pair of driven wheels having a common axis of rotation coupled to said second intermediate body section, the axis of rotation of said first pair of driven wheels being at or proximate to the first point of transverse articulation;

(c) a second pair of driven wheels having a common axis of rotation coupled to said third elongated body section, the axis of rotation of said second pair of driven wheels being at or proximate to the second point of transverse articulation; and (d) means to drive said first and second pair of driven wheels.

3. An articulated mine-haulage vehicle comprising:
(a) a body member comprising a first elongated body section providing at a first end thereof, a first pair of steering wheels, said first elongated body section connected at an end opposed to the first end thereof in articulating relation to a first end of a second intermediate body section to form a first point of articulation, said intermediate body section connected at a second end opposed to the first end thereof in articulating relation to a first end of a third elongated body section to form a second point of articulation spaced from the first point of articulation, the third elongated body section providing at a second end opposed to the first end thereof, a second pair of steering wheels, said body member including compartment and conveying means for loading, carrying and discharging mined materials;

(b) a first pair of driven wheels having a common axis of rotation coupled to said second intermediate body section, the axis of rotation of the first pair of driven wheels being between the first and second points of articulation;

(c) a second pair of driven wheels having a common axis of rotation coupled to said third elongated body section, the axis of rotation of the second pair of driven wheels being between said second point of articulation and said second pair of steering wheels; and (d) means to drive said first and second pair of driven wheels.

4. An articulated mine-haulage vehicle comprising:
(a) a body member comprising a first elongated body section providing at a first end thereof, a first pair of steering wheels, said first elongated body section connected at an end opposed to the first end thereof in articulating relation to a first end of a second intermediate body section to form a first point of transverse articulation, said intermediate body section connected at a second end opposed to the first end thereof in articulating relation to a first end of a third elongated body section to form a second point of transverse articulation spaced from the first point of transverse articulation, the third elongated body section providing at a second end opposed to the first end thereof a second pair of steering wheels, said body member including compartment and conveying means for loading, carrying, and discharging mined materials;

(b) a first pair of driven wheels having a common axis of rotation coupled to said second intermediate body section, the axis of rotation of the first pair of driven wheels being between the first and second points of transverse articulation;

(c) a second pair of driven wheels having a common axis of rotation coupled to said third elongated body section, the axis of rotation of the second pair of driven wheels being between said second point of transverse articulation and said second pair of steering wheels; and (d) means to drive said first and second pair of driven wheels.

5. An articulated mine-haulage vehicle comprising:
(a) a body member comprising a first elongated body section providing at a first end thereof, a first pair of steering wheels, said first elongated body section connected at an end opposed to the first end thereof in articulating relation to a first end of a second intermediate body section to form, by means extending through the intermediate body section, a first point of transverse articulation, said intermediate body section connected at a second end opposed to the first end thereof in articulating relation to a first end of a third elongated body section to form, by means extending through the third elongated body section, a second point of transverse articulation spaced from the first point of transverse articulation, the third elongated body section providing a second end, opposed to the first end thereof, a second pair of steering wheels, said body member including compartment and conveying means for loading, carrying, and discharging mined materials;

(b) a first pair of driven wheels having a common axis of rotation coupled to said second intermediate body section and spaced above and adjacent to the first point of transverse articulation;

(c) a second pair of driven wheels having a common axis of rotation coupled to said third elongated body section and spaced above and adjacent to the second point of transverse articulation; and (d) means to drive said first and second pair of driven wheels.

6. An articulated mine-haulage vehicle as claimed in claim 5, in which the common axis of rotation of the first pair of driven wheels is between the first and second points of transverse articulation.

7. An articulated mine-haulage vehicle as claimed in claim 5, in which the common axis of rotation of the second pair of driven wheels is between the second point of transverse articulation and the second pair of steering wheels.

8. An articulated mine-haulage vehicle as claimed in claim 6, in which the common axis of rotation of the second pair of driven wheels is between the second point of transverse articulation and the second pair of steering wheels.

9. An articulated mine-haulage vehicle comprising:
(a) a body member comprising a first elongated body section having first side walls, a second intermediate body section having second side walls, and a third elongated body section having third side walls, said first elongated body section providing at a first end thereof, a first pair of steering wheels, and connected at the first side walls at an end opposed to the first end thereof by a first hinge tube in articulating relation to the second side walls of a first end of the second intermediate body section to form a first point of transverse articulation, said intermediate body section connected at the second side walls at a second end opposed to the first end thereof by a second hinge tube in articulating relation to the third side walls at a first end of the third elongated body section to form a second point of transverse articulation spaced from the first point of transverse articulation, the third elongated body section providing at a second end opposed to the first end thereof a second pair of steering wheels, said body member including conveying means for loading, carrying, and discharging mined materials;

(b) a first pair of driven wheels having a common axis of rotation coupled to the second side walls of said second intermediate body section, the axis of rotation of the first pair of driven wheels being spaced above and adjacent the first point of transverse articulation and between the first and second points of transverse articulation;

(c) a second pair of driven wheels having a common axis of rotation coupled to the third side walls of said third elongated body section, the axis of rotation of the second pair of driven wheels being spaced above and adjacent the second point of transverse articulation and between said second point of transverse articulation and said second pair of steering wheels; and (d) means to drive said first and second pair of driven wheels.

* * * * *